US007948238B2

(12) United States Patent
Bittar

(10) Patent No.: US 7,948,238 B2
(45) Date of Patent: *May 24, 2011

(54) ELECTROMAGNETIC WAVE RESISTIVITY TOOL HAVING A TILTED ANTENNA FOR DETERMINING PROPERTIES OF EARTH FORMATIONS

(75) Inventor: Michael S. Bittar, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/467,427

(22) Filed: May 18, 2009

(65) Prior Publication Data
US 2009/0224764 A1 Sep. 10, 2009

Related U.S. Application Data

(60) Continuation of application No. 12/127,634, filed on May 27, 2008, now Pat. No. 7,557,579, which is a continuation of application No. 11/745,822, filed on May 8, 2007, now abandoned, which is a continuation of application No. 11/457,709, filed on Jul. 14, 2006, now Pat. No. 7,265,552, which is a continuation of application No. 11/198,066, filed on Aug. 5, 2005, now Pat. No. 7,138,803, which is a continuation of application No. 10/616,429, filed on Jul. 9, 2003, now Pat. No. 7,019,528, which is a division of application No. 10/255,048, filed on Sep. 25, 2002, now Pat. No. 6,911,824, which is a division of application No. 09/615,501, filed on Jul. 13, 2000, now Pat. No. 6,476,609, which is a continuation-in-part of application No. 09/238,832, filed on Jan. 28, 1999, now Pat. No. 6,163,155.

(51) Int. Cl.
G01V 3/30 (2006.01)
G01V 3/38 (2006.01)

(52) U.S. Cl. ............... 324/337; 324/339; 702/7

(58) Field of Classification Search .......... 324/332, 324/333, 334, 335, 336, 337, 338, 339, 340, 324/341, 342, 343; 702/7; 175/50
See application file for complete search history.

(56) References Cited

U.S. PATENT DOCUMENTS
2,901,689 A 8/1959 Barrett
(Continued)

FOREIGN PATENT DOCUMENTS
EP 527089 2/1993
(Continued)

OTHER PUBLICATIONS

Norway Office Action, dated Apr. 3, 2009, Application No. 20013707, "Electromagnetic Wave Resistivity Tool Having a Tilted Antenna for Determining the Horizontal and Vertical Resistivities and Relative Dip Angle in Anisotropic Earth Formations", filed Jan. 24, 2000, 5 pgs.

(Continued)

Primary Examiner — Kenneth J Whittington
(74) Attorney, Agent, or Firm — Krueger Iselin LLP

(57) ABSTRACT

This invention is directed to a downhole method and apparatus for simultaneously determining the horizontal resistivity, vertical resistivity, and relative dip angle for anisotropic earth formations. The present invention accomplishes this objective by using an antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Although this invention is primarily intended for MWD or LWD applications, this invention is also applicable to wireline and possibly other applications.

2 Claims, 10 Drawing Sheets

U.S. PATENT DOCUMENTS

| | | | |
|---|---|---|---|
| 3,014,177 A | 12/1961 | Hungerford et al. |
| 3,187,252 A | 6/1965 | Hungerford |
| 3,286,163 A | 11/1966 | Holser et al. |
| 3,412,815 A | 11/1968 | Holser |
| 3,510,757 A | 5/1970 | Huston |
| 3,539,911 A | 11/1970 | Youmans et al. |
| 3,561,007 A | 2/1971 | Gouilloud et al. |
| 3,808,520 A | 4/1974 | Runge |
| 3,982,176 A | 9/1976 | Meador |
| 4,302,722 A | 11/1981 | Gianzero |
| 4,319,191 A | 3/1982 | Meador et al. |
| 4,360,777 A | 11/1982 | Segesman |
| 4,536,714 A | 8/1985 | Clark |
| 4,553,097 A | 11/1985 | Clark |
| 4,611,173 A | 9/1986 | Bravenec et al. |
| 4,636,731 A | 1/1987 | Savage et al. |
| 4,651,101 A | 3/1987 | Barber et al. |
| 4,697,190 A | 9/1987 | Oswald |
| 4,700,142 A | 10/1987 | Kuckes |
| 4,780,857 A | 10/1988 | Lyle et al. |
| 4,785,247 A | 11/1988 | Meador et al. |
| 4,791,373 A | 12/1988 | Kuckes |
| 4,808,929 A | 2/1989 | Oldigs |
| RE32,913 E | 4/1989 | Clark |
| 4,845,433 A | 7/1989 | Kleinberg |
| 4,873,488 A | 10/1989 | Barber et al. |
| 4,899,112 A | 2/1990 | Clark et al. |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,962,490 A | 10/1990 | Lyle et al. |
| 4,980,643 A | 12/1990 | Gianzero et al. |
| 5,089,779 A | 2/1992 | Rorden |
| 5,115,198 A | 5/1992 | Gianzero et al. |
| 5,200,705 A | 4/1993 | Clark et al. |
| 5,210,495 A | 5/1993 | Hapashy et al. |
| 5,230,386 A | 7/1993 | Wu et al. |
| 5,239,448 A | 8/1993 | Perkins et al. |
| 5,241,273 A | 8/1993 | Luling |
| 5,243,290 A | 9/1993 | Safinya |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,389,881 A | 2/1995 | Bittar et al. |
| 5,402,068 A | 3/1995 | Meador et al. |
| 5,428,293 A | 6/1995 | Sinclair et al. |
| 5,442,294 A | 8/1995 | Rorden |
| 5,485,089 A | 1/1996 | Kuckes |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,589,775 A | 12/1996 | Kuckes |
| 5,594,343 A | 1/1997 | Clark et al. |
| 5,656,930 A | 8/1997 | Hagiwara |
| 5,720,355 A | 2/1998 | Lamine et al. |
| 5,725,059 A | 3/1998 | Kuckes et al. |
| 5,757,191 A | 5/1998 | Gianzero |
| 5,781,436 A | 7/1998 | Forgang et al. |
| 5,854,991 A | 12/1998 | Gupta et al. |
| 5,886,526 A | 3/1999 | Wu |
| 5,892,460 A | 4/1999 | Jerabek et al. |
| 5,923,170 A | 7/1999 | Kuckes |
| 5,999,883 A | 12/1999 | Gupta et al. |
| 6,044,325 A | 3/2000 | Chakravarthy et al. |
| 6,147,496 A | 11/2000 | Strack et al. |
| 6,158,532 A | 12/2000 | Logan et al. |
| 6,163,155 A | 12/2000 | Bittar |
| 6,181,138 B1 | 1/2001 | Hagiwara et al. |
| 6,191,586 B1 | 2/2001 | Bittar |
| 6,218,841 B1 | 4/2001 | Wu |
| 6,218,842 B1 | 4/2001 | Bittar |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,466,020 B2 | 10/2002 | Kuckes et al. |
| 6,476,609 B1 | 11/2002 | Bittar |
| 6,538,447 B2 | 3/2003 | Bittar |
| 6,541,979 B2 | 4/2003 | Omeragic |
| 6,566,881 B2 | 5/2003 | Omeragic et al. |
| 6,573,722 B2 | 6/2003 | Rosthal et al. |
| 6,614,229 B1 | 9/2003 | Clark et al. |
| 6,710,600 B1 | 3/2004 | Kopecki et al. |
| 6,736,222 B2 | 5/2004 | Kuckes et al. |
| 6,777,940 B2 | 8/2004 | Macune |
| 6,810,331 B2 | 10/2004 | Bittar et al. |
| 6,863,127 B2 | 3/2005 | Clark et al. |
| 6,885,943 B2 | 4/2005 | Bittar et al. |
| 6,900,640 B2 | 5/2005 | Fanini et al. |
| 6,911,824 B2 | 6/2005 | Bittar |
| 6,944,546 B2 | 9/2005 | Xiao et al. |
| 7,019,528 B2 | 3/2006 | Bittar |
| 7,038,455 B2 | 5/2006 | Beste et al. |
| 7,046,010 B2 | 5/2006 | Hu et al. |
| 7,138,803 B2 | 11/2006 | Bittar |
| 7,202,670 B2 | 4/2007 | Omeragic et al. |
| 7,227,363 B2 | 6/2007 | Gianzero et al. |
| 7,265,552 B2 | 9/2007 | Bittar |
| 7,394,257 B2 | 7/2008 | Martinez et al. |
| 7,557,579 B2 * | 7/2009 | Bittar ........................... 324/337 |
| 7,659,722 B2 * | 2/2010 | Bittar ........................... 324/337 |
| 7,786,733 B2 | 8/2010 | Seydoux et al. |
| 7,848,887 B2 | 12/2010 | Yang et al. |
| 2003/0051914 A1 | 3/2003 | Bittar |
| 2003/0055565 A1 | 3/2003 | Omeragic |
| 2003/0076107 A1 | 4/2003 | Fanini et al. |
| 2004/0196047 A1 | 10/2004 | Fanini et al. |
| 2005/0006090 A1 | 1/2005 | Chemali et al. |
| 2005/0024060 A1 | 2/2005 | Bittar |
| 2005/0083063 A1 | 4/2005 | Omeragic et al. |
| 2005/0140373 A1 | 6/2005 | Li et al. |
| 2005/0218898 A1 | 10/2005 | Fredette et al. |
| 2006/0011385 A1 | 1/2006 | Seydoux et al. |
| 2006/0015256 A1 | 1/2006 | Hassan et al. |
| 2006/0125479 A1 | 6/2006 | Chemali et al. |
| 2006/0244455 A1 | 11/2006 | Bittar |
| 2007/0278008 A1 | 12/2007 | Kuckes et al. |
| 2008/0136419 A1 | 6/2008 | Seydoux et al. |
| 2009/0015260 A1 | 1/2009 | Bittar |

FOREIGN PATENT DOCUMENTS

| | | |
|---|---|---|
| EP | 0814349 | 12/1997 |
| EP | 0840142 | 5/1998 |
| EP | 0093519 | 7/1999 |
| FR | 2 699 286 | 12/1992 |
| GB | 2 279 149 | 12/1994 |
| RU | 2279697 | 10/2003 |
| RU | 2305300 | 8/2007 |
| WO | WO9531736 | 11/1995 |
| WO | WO-98/00733 | 1/1998 |
| WO | WO-00/41006 | 7/2000 |
| WO | WO0050926 | 8/2000 |
| WO | WO-01/55748 | 8/2001 |
| WO | WO-03/069120 | 8/2003 |
| WO | WO-2007/149106 | 12/2007 |
| WO | WO-2008/021868 | 2/2008 |

OTHER PUBLICATIONS

International Search Report and Written Opinion, dated Jun. 27, 2008, Appl No. PCT/US08/51447, EM-Guided Drilling Relative to an Existing Borehole, filed Jan. 18, 2008 8 pgs.

EP Search Report, dated Sep. 25, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 7 pgs.

Written Opinion of the International Searching Authority, dated Feb. 5, 2008, Appl No. PCT/US07/64221, "Robust Inversion systems and Methods for Azimuthally Sensitive Resistivity Logging Tools", filed Mar. 16, 2007, 4 pgs.

International Preliminary Report on Patentability, dated Oct. 1, 2009, Appl No. PCT/US07/064221, Robust Inversion Systems and Methods for Azimuthally Sensitive Resistivity Logging Tools, filed Mar. 16, 2007.
EP Search Report, dated Nov. 20, 2009, Appl No. 09166405.2, "Electromagnetic Wave Resistivity Tool Having a Tilted Antenna for Determining the Horizontal and Vertical Resistivities and Related Dip Angle in Anisotropic Earth Formations", filed Jul. 24, 2009, 6 pgs.
EP Search Report, dated Nov. 17, 2009, Appl No. 09166404.5, "Electromagnetic Wave Resistivity tool Having a Tilted Antenna for Determining the Horizontal and Vertical Resistivities and Relative Dip Angle in Anisotropic Earth Formations", filed Jul. 24, 2009, 4 pgs.
EP Search Report, dated Dec. 14, 2009, Appl No. 09166566.1, "Electromagnetic Wave Resistivity Tool Having a Tilted Antenna for Determing the Horizontal and Vertical Resistivities and Relative Dip Angle in Anisotropic Earth Formations", filed Jul. 28, 2009, 9 pgs.
European Search Report, dated Oct. 16, 2009, Appl No. 09166567.9, Electromagnetic Wave Resistivity Tool Having a Tilted Antenna for Determining the Horizontal and Vertical Resistivities and Relative Dip Angle in Anisotropic Earth Formations, filed Jul. 28, 2009, 5 pgs.
Advisory Action, dated Apr. 13, 2007, U.S. Appl. No. 11/457,709, "Electromagnetic Wave Resistivity Tool Having a Tilted Antenna for Geosteering Within a Desired Payzone", filed Jul. 14, 2006.
Advisory Action, dated Sep. 15, 2005, U.S. Appl. No. 10/616,429, "Electromagnetic Wave Resistivity Tool Having a Tilted Antenna for Geosteering Within a Desired Payzone", filed Jul. 9, 2003.
Canadian Office Action, dated Jan. 23, 2009, Application No. 2,415,563, "Electromagnetic Wave Resistivity Tool With A Tilted Antenna", filed Jan. 10, 2001.
Canadian Office Action, dated Jan. 29, 2007, Application No. 2,415,563, "Electromagnetic Wave Resistivity Tool With A Tilted Antenna", filed Jul. 10, 2001.
Canadian Office Action, dated Jun. 7, 2005, Application No. 2,415,563, "Electromagnetic Wave Resistivity Tool With A Tilted Antenna", filed Jul. 10, 2001.
Canadian Office Action, dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000.
Canadian Office Action, dated Nov. 1, 2007, Application No. 2,415,563, "Electromagnetic Wave Resistivity Tool With A Tilted Antenna", filed Jan. 10, 2001.
European Office Action, dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Form . . . ", filed Jul. 10, 2001.
European Office Action, dated Apr. 29, 2008, Application No. 00908351.0, "Electromagnetic Wave Resistivity Tool Having Tilted Antenna", filed Jan. 24, 2000.
European Office Action, dated Jul. 17, 2006, Appl No. 01 096 294.3, Electromagnetic Wave Resistivity Tool Having a Tilted Antenna for Determining the Horizontal and Vertical Resistivities and Relative Dip Angle in Anisotropic Earth Formations, filed Jul. 10, 2001.
European Office Action, dated Jul. 31, 2007, Appl No. 00908351.0, "Electromagnetic Wave Resistivity Tool Having a Tilted Antenna for Determining the Horizontal and Vertical Resistivities and Relative Dip Angle in Anisotropic Earth Formations" filed Jan. 24, 2000.
European Office Action, dated Jul. 31, 2007, Application No. 00908351.0, "Electromagnetic Wave Resistivity Tool Having Tilted Antenna", filed Jan. 24, 2000.
European Office Action, dated Sep. 13, 2007, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
European Office Action, dated Sep. 23, 3008, Appl No. 01096 294.3, Electromagnetic wave resistivity tool having a tilted antenna for determining the horizontal and vertical resistivities and relative dip angle in anisotropic earth formations Jul. 10, 2001.
European Supplemental Search Report, dated Jun. 12, 2003 Appl No. 00908351.0, "Electromagnetic Wave Resistivity Tool Having a Tilted Antenna for Determining the Horizontal and Vertical Resistivities and Relative Dip Angle in Anisotropic Earth Formations", Jan. 24, 2000.
Eurpoean Office Action, dated Sep. 27, 2005, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001.
PCT International Preliminary Examination Report, dated Nov. 4, 2002, Appl No. PCT/US01/41319 "Electromagnetic Wave Resistivity Tool Having a Tilted Antenna for Geosteering Within a Desired Payzone", filed Jul. 10, 2001.
PCT International Search Report and Written Opinion, dated May 15, 2000, Appl No. PCT/US00/01693, "Electromagnetic Wave Resistivity Tool Having a Tilted Antenna for Determining the Horizontal and Vertical Resistivities and Relative Dip Angle in Anisotropic Earth Form . . . " 01/24/200.
PCT International Search Report, dated Jan. 31, 2008, Appl No. PCT/US07/15806, "Modular Geosteering Tool Assembly", filed Jul. 11, 2007.
PCT International Search Report, dated Feb. 5, 2008, Appl No. PCT/US07/64221, "Robust Inversion Systems and Methods for Azimuthally Sensitive Resistivity Logging Tools", filed Mar. 16, 2007.
PCT International Search Report, dated Feb. 27, 2008, Appl No. PCT/US07/75455, "Resistivity Logging with Reduced Dip Artifacts", filed Aug. 8, 2007.
PCT International Search Report, dated Apr. 30, 2008, Appl No. PCT/US06/62149, Antenna Coupling Component Measurement Tool Having a Rotating Antenna Configuration, filed Dec. 15, 2006.
PCT International Search Report, dated May 15, 2002, Appl No. PCT/US00/01693, Electromagnetic Wave Resistivity Tool Having a Tilted Antenna for Determining the Horizontal and Vertical Resistivities and Relative Dip Angle in Anisotropic Earth Formations, filed Jan. 24, 2000.
PCT International Search Report, dated May 15, 2008, Appl No. PCT/US07/15744, "Method and Apparatus for Building a Tilted Antenna", filed Jul. 11, 2007.
PCT International Search Report, dated Sep. 18, 2001, Appl No. PCT/US01/41319 "Electromagnetic Wave Resistivity Tool Having a Tilted Antenna for Geosteering Within a Desired Payzone", filed Jul. 10, 2001.
PCT International Search Report, dated Sep. 18, 2001, Appl No. US01/41319, "Electromagnetic Wave Resistivity Tool Having a Tilted Antenna for Determining the Horizontal and Vertical Resistivities and Relative Dip Angle in Anisotropic Earth Formations", filed Aug. 6, 2002.
PCT Written Opinion, dated Aug. 6, 2002, International Application No. PCT/US01/41319, "Electromagnetic Wave Resistivity Tool Having a Tilted Antenna for Geosteering Within a Desired Payzone", filed Jul. 10, 2001.
US Final Office Action, dated Jan. 19, 2007, U.S. Appl. No. 11/457,709, "Electromagnetic Wave Resistivity Tool Having a Tilted Antenna for Geosteering Within a Desired Payzone", filed Jul. 14, 2006.
US Final Office Action, dated Jun. 6, 2005, U.S. Appl. No. 10/616,429, "Electromagnetic Wave Resistivity Tool Having a Tilted Antenna for Geosteering Within a Desired Payzone", filed Jul. 9, 2003.
US Final Office Action, dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", Sep. 25, 2002.
US Non-Final Office Action, dated Feb. 24, 2009, U.S. Appl. No. 12/127,634, "Electromagnetic Wave Resistivity Tool Having a Tilted Antenna for Determining the Horizontal and Vertical Resistivities and Relative Dip Angle in Anisotropic Earth Form . . . ", filed May 27, 2008.
US Non-Final Office Action, dated Apr. 26, 2000, Appl. No. 09/23832, "Electromagnetic Wave Resistivity Tool Having a Tilted Antenna for Determining the Horizontal and Vertical Resistivities and Relative Dip Angle in Anisotropic Earth Formations", filed Jan. 28, 1999.

US Non-Final Office Action, dated Jul. 28, 2003, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", Sep. 25, 2002.

US Non-Final Office Action, dated Aug. 26, 2004, Application No. Jul. 9, 2003, "Electromagnetic Wave Resistivity Tool Having a Tilted Antenna for Geosteering Within a Desired Payzone", filed Jul. 9, 2003.

US Non-Final Office Action, dated Sep. 6, 2007, U.S. Appl. No. 11/745,822, Electromagnetic Wave Resistivity Tool Having a Tilted Antenna for Geosteering Within a Desired Payzone:, filed May 8, 2007.

US Non-Final Office Action, dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005.

US Non-Final Office Action, dated Aug. 18, 2006, U.S. Appl. No. 11/457,709, "Electromagnetic Wave Resistivity Tool Having a Tilted Antenna for Geosteering Within a Desired Payzone", filed Jul. 14, 2006.

Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006), pp. 1-14.

Bittar, Michael S., "Electromagnetic Wave Resistivity Tool Having a Tilted Antenna for Geosteering within a Desired Payzone", Application No. 20050024060, (Feb. 3, 2005).

Bittar, Michael S., Processing Resistivity Logs, US PRV Patent—U.S. Appl. No. 60/821,721, filed Aug. 8, 2006.

Bittar, Michael S., "Resistivity Logging with Reduced Dip Artifacts", PCT Patent Application US2007/075455, filed Aug. 8, 2006.

Bittar, Michael S., "Tool for Azimuthal Resistivity Measurement and Bed Boundary Detection", PRV. U.S. Appl. No. 60/821,988, filed Aug. 10, 2006.

Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs. of Figs.

Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994), pp. 1-12, plus 11 pgs. of Figs.

Bittar, Michael S., et al., "The Effects of Rock Anisotropy on MWD Electromagnetic Wave Resistivity Sensors", The Log Analyst, (Jan. 1996), pp. 20-30.

Bittar, Michael S., et al., "The Effects of Rock Anisotropy on MWD Electromagnetic Wave Resistivity Sensors", SPWLA 35th Annual Logging Symposium, Jun. 19-22, 1994, 18 pgs.

Bittar Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.

Bonner, S. et al., "A New Generation of Electrode Resistivity Measurements for Formation Evaluation While Drilling", SPWLA 35th Annual Logging Symposium, (Jun. 19, 1994), pp. 1-19.

Clark, Brian et al., "A Dual Depth Resistivity Measurement for Fewd", SPWLA 29th Annual Logging Symposium, (Jun. 1988), 25 pgs.

Clark, Brian et al., "Electromagnetic Propagation Logging While Drilling: Theory and Experiment", SPE Formation Evaluation, (Sep. 1990), pp. 263-271.

Fanini, et al., "Method and Apparatus for a Multi-Component Induction Instrument Measuring System for Geosteering and Formation Resistivity Data Interpretation in Horizontal, Vertical and Deviated Wells", 20040196047, (Aug. 7, 2004).

Fanini, et al., "Method and Apparatus for Multi-Component Induction Instrument. . . ." 20030076107, (Apr. 24, 2003).

Hagiwara, T. "A New Method to Determine Horizontal-Resistivity in Anisotropic Formations Without Prior Knowledge of Relative Dip", 37th Annual SPWLA Logging Symposium, New Orleans, LA, (Jun. 16, 1996), pp. 1-5 , plus 3 pgs. of Figs.

Li, Qiming et al., "New Directional Electromagnetic Tool for Proactive Geosteering and Accurate Formation Evaluation While Drilling", SPWLA 46th Annual Logging Symposium, New Orleans, LA, USA, (Jun. 26, 2005), pp. 1-16.

Luling, M. et al., "Processing and Modeling 2-MHz Resistivity Tools in Dipping, Laminated, Anisotropic Formations: SPWLA", SPWLA 35th Annual Logging Symposium, paper QQ, (1994), pp. 1-25.

Mack, S. G., et al., "MWD Tool Accurately Measures Four Resistivities", Oil & Gas Journal, (May 25, 1992), pp. 1-5.

Mechetin, V. F., et al., "Temp—A New Dual Electromagnetic and Laterolog Apparatus—Technological Complex", All-Union Research Logging Institute, Ufa, USSR. Ch. Ostrander, Petro Physics Int'l, Dallas, Texas, USA, 17 pgs.

Meyer, W. H., "New Two Frequency Propagation Resistivity Tools", SPWLA 36th Annual Logging Symposium, (Jun. 26-29, 1995), 12 pgs.

Rodney, Paul F., et al., "Electromagnetic Wave Resistivity MWD Tool", SPE Drilling Engineering, (Oct. 1986), pp. 37-346.

Zhu, Tianfei et al., "Two Dimensional Velocity Inversion and Synthetic Computation", Geophysics, vol. 52, No. 1, (Jan. 1987), pp. 37-49.

EP Non-Final Office Action, dated Dec. 30, 2009, Appl No. 01 962 294.03, Electromagnetic Wave Resistivity Tool Having a Tilted Antenna for Geosteering Within a Desired Payzone, filed Jul. 1, 2001, 3 pgs.

US Non-Final Office Action, dated Jun. 3, 2010, U.S. Appl. No. 12/467,434, "Electromagnetic Wave Resistivity Tool Having a Tilted Antenna for Geosteering within a Desired Payzone", filed May 18, 2009, 19 pgs.

Preliminary Report on Patentability, dated Jul. 29, 2010, Appl No. PCT/US08/51447, "EM-Guided Drilling Relative to an Existing Borehole", filed Jan. 18, 2008, 7 pgs.

European Office Action, dated Sep. 3, 2010, Appl No. 09166567.9, Electromagnetic Wave Resistivity Tool Having a Tilted Antenna, filed Jul. 28, 2009, 4 pgs.

PCT International Preliminary Report on Patentability, dated Apr. 30, 2008, Appl No. PCT/US06/62149, "Antenna Coupling Component Measurement Tool Having a Rotating Antenna Configuration", filed Dec. 15, 2006, 6 pgs.

US Final Office Action, dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", May 18, 2009, 24 pgs.

US Final Office Action, dated Oct. 22, 2010, U.S. Appl. No. 12/467,434, "Electromagnetic Wave Resistivity Tool Having a Tilted Antenna for Geosteering Within a Desired Payzone", filed May 18, 2009, 19 pgs.

US Non-Final Office Action, dated Nov. 26, 2010, U.S. Appl. No. 12/299,760, "Robust Inversion Systems and Methods for Azimuthally Sensitive Resistivity Logging Tools", filed Nov. 5, 2008, 18 pgs.

US Non-Final Office Action, dated Dec. 23, 2010, U.S. Appl. No. 12/306,267, "Modular Geosteering Tool Assembly", filed Dec. 23, 2008, 18 pgs.

* cited by examiner

ELECTROMAGNETIC WAVE RESISTIVITY TOOL HAVING A TILTED ANTENNA FOR DETERMINING PROPERTIES OF EARTH FORMATIONS

CROSS-REFERENCE TO RELATED APPLICATIONS

The present application is a continuation of U.S. patent application Ser. No. 12/127,634, filed May 27, 2008 (now U.S. Pat. No. 7,557,579), which is a continuation of U.S. patent application Ser. No. 11/745,822, filed May 8, 2007 (now abandoned), which in turn is a continuation of U.S. patent application Ser. No. 11/457,709, filed on Jul. 14, 2006 (now U.S. Pat. No. 7,265,552), which in turn is a continuation of U.S. patent application Ser. No. 11/198,066, filed on Aug. 5, 2005 (now U.S. Pat. No. 7,138,803), which in turn is a continuation of U.S. patent application Ser. No. 10/616,429, filed on Jul. 9, 2003 (now U.S. Pat. No. 7,019,528), which in turn is a divisional of U.S. patent application Ser. No. 10/255,048, filed on Sep. 25, 2002 (now U.S. Pat. No. 6,911,824), which in turn is a divisional of U.S. patent application Ser. No. 09/615,501, filed on Jul. 13, 2000 (now U.S. Pat. No. 6,476,609), which in turn is a continuation-part of U.S. patent application Ser. No. 09/238,832 filed Jan. 28, 1999 (now U.S. Pat. No. 6,163,155), all of which are hereby incorporated by reference. The present application further relates to U.S. patent application Ser. No. 12/467,434, filed May 20, 2010; U.S. patent application Ser. No. 12/127,672, filed May 27, 2008 (now U.S. Pat. No. 7,557,580); U.S. patent application Ser. No. 11/835,619, filed Aug. 8, 2007 (now U.S. Pat. No. 7,659,722); and U.S. patent application Ser. No. 10/634,115, filed Aug. 4, 2003.

BACKGROUND OF THE INVENTION

1. Field of the Invention

This invention relates generally to a method and apparatus for determining the horizontal and vertical resistivities and the relative dip angle of a borehole in an electrically anisotropic earth formation. More specifically, this invention relates to an electromagnetic wave induction technique for measuring resistivity using a tool having an antenna that is disposed within a plane which is inclined with respect to a plane that is normal to the axis of the tool.

2. Description of the Related Art

In the field of petroleum well drilling and logging, electromagnetic wave resistivity sensors are frequently used to provide an indication of the electrical resistivity of rock formations surrounding an earth borehole. Such information regarding resistivity is useful in ascertaining the presence or absence of hydrocarbons. A typical electromagnetic wave resistivity tool comprises a transmitter antenna and a pair of receiver antennas located at different distances from the transmitter antenna along the axis of the tool. The transmitter antenna is used to transmit electromagnetic waves into the surrounding formation. In turn, the magnetic field in the formation induces an electrical voltage in each receiver antenna. Due to geometric spreading and absorption by the surrounding earth formation, the induced voltages in the two receiving antennas have different phases and amplitudes. Experiments have shown that the phase difference (Φ) and amplitude ratio (attenuation, A) of the induced voltages in the receiver antennas are indicative of the resistivity of the formation. The point in the formation (as defined by a radial distance from the tool axis) to which such a resistivity measurement pertains is a function of the frequency of the transmitter and the distance from the transmitter to the mid-point between the two receivers. Thus, one may achieve multiple radial depths of investigation of resistivity either by providing multiple transmitters at different distances from the receiver pair or by operating a single transmitter at multiple frequencies.

If a formation is electrically isotropic, the resistivities measured at the various depths of investigation by such an electromagnetic wave resistivity tool will be the same. However, if the resistivities corresponding to the various depths of investigation are different, such differences indicate that the formation being measured is electrically anisotropic. In electrically anisotropic formations, the anisotropy is generally attributable to extremely fine layering during the sedimentary build-up of the formation. Hence, in a formation coordinate system oriented such that the x-y plane is parallel to the formation layers and the z axis is perpendicular to the formation layers, resistivities $R_x$ and $R_y$ in directions x and y, respectively, are the same, but resistivity $R_z$ in the z direction is different from $R_x$ and $R_y$. Thus, the resistivity in a direction parallel to the plane of the formation (i.e., the x-y plane) is known as the horizontal resistivity, $R_h$, and the resistivity in the direction perpendicular to the plane of the formation (i.e., the z direction) is known as the vertical resistivity, $R_v$. The index of anisotropy, α, is defined as $\alpha=[R_v/R_h]^{1/2}$.

The relative dip angle, θ, is the angle between the borehole axis (tool axis) and the normal to the plane of the formation. If the axis of an electromagnetic wave resistivity tool is perpendicular to the plane of an anisotropic formation (i.e., θ=0°), both the phase shift and amplitude attenuation measurements reflect only the horizontal resistivity. However, if the axis of the tool is inclined with respect to the normal of the formation plane (i.e., for non-zero relative dip angle), the rock anisotropy affects the resistivity derived from phase shift measurements ("phase shift resistivity" or $R_Φ$) differently than it affects the resistivity derived from amplitude attenuation measurements ("amplitude attenuation resistivity" or $R_A$). For small relative dip angles (e.g., θ less than about 45°), the difference between phase shift and amplitude attenuation resistivities is relatively small. However, this difference becomes significant for relative dip angles greater than about 50°, and the difference is large for horizontal boreholes (i.e., θ=90°).

Before the present invention, practitioners in the art have used a number of techniques to determine the anisotropy of earth formations, most of which involve the use of coil antennas to measure resistivity. However, each of the existing techniques suffers from one or more disadvantages. For example, U.S. Pat. No. 4,980,643, issued Dec. 25, 1990 to Gianzero and Su, teaches the use of additional receiver coils oriented differently from (not co-axial with) conventional receiver coils to detect skew signals induced by skewness in the magnetic field pattern in the presence of asymmetrical formations. The axis of such additional receiver coils according to the '643 patent is preferably orthogonal to that of the conventional receiver coils, which are co-axial with the tool axis. However, such orthogonal coil (antenna) configurations are not generally considered practical for a measuring while drilling (MWD) or logging while drilling (LWD) tool because, if the coil is located in the interior of the tool, the presence of the coil necessitates a non-conventional mud flow path and decreases the mechanical strength of the tool. If, on the other hand, the additional coil is located on the exterior of the tool, the coil is susceptible to damage by formation cuttings in the return mud flow.

Similarly, U.S. Pat. No. 5,329,448, issued Jul. 12, 1994 to Rosthal, discloses a method and apparatus for determining the horizontal and vertical resistivities of an earth formation using an iterative error minimization technique. However, the '448 patent, which discloses a conventional antenna configuration in which the transmitter and receiver coils are aligned co-axially with the tool, does not provide a way to determine the relative dip angle. Instead, the relative dip angle must be obtained from another measurement source or from prior knowledge of the formation. Likewise, U.S. Pat. No. 5,656,930, issued Aug. 12, 1997 to Hagiwara, discloses a method for determining the anisotropic properties of subterranean formations comprising thinly laminated sand/shale sequences using an induction logging tool. However, like the '448 patent, the method of the '930 patent requires the derivation of the relative dip angle from another measurement.

In a technical paper entitled "A New Method to Determine Horizontal Resistivity in Anisotropic Formations Without Prior Knowledge of Relative Dip," 37th SPWLA 37th Annual Logging Symposium, New Orleans, Jun. 16-19, 1996, Hagiwara discloses a method to determine the horizontal resistivity for deviated boreholes or dipping formations using two conventional induction-type resistivity measurements. However, Hagiwara's method does not provide the relative dip angle. To obtain the relative dip angle, the formation anisotropy must be known. Moreover, Hagiwara showed that, for conventional induction logging tools (in which the transmitter and receiver antennas are oriented co-axially with the tool), it is impossible to obtain all three parameters (horizontal resistivity, vertical resistivity, and relative dip angle) simultaneously. The reason such a simultaneous solution is not possible using conventional induction logging tools is that, in the response of such tools, the vertical resistivity and the relative dip angle are coupled (i.e., they are not independent).

In European Patent Application No. 97118854.5 by Wu, published May 6, 1998, Wu discloses a method and apparatus for determining horizontal conductivity, vertical conductivity, and relative dip angle during a drilling operation. If the relative dip angle is unknown, Wu's technique involves the formulation of a relationship between the dielectric constants of the formation to the anisotropic conductivities of the formation. However, in the proof by Hagiwara mentioned above, the dielectric constants are assumed quantities, and their contribution to the phase shift resistivity is minimal. Therefore, even if the dielectric constants are known, the vertical resistivity and the relative dip angle are still coupled and do not allow for a simultaneous solution.

It would, therefore, be a significant advancement in the art to provide an improved method and apparatus for simultaneously determining the horizontal resistivity, vertical resistivity, and relative dip angle in a MWD or LWD mode of operation.

SUMMARY OF THE INVENTION

Accordingly, this invention is directed to an improved downhole method and apparatus for simultaneously determining the horizontal resistivity, vertical resistivity, and relative dip angle for anisotropic earth formations. The present invention accomplishes this objective by using an antenna configuration in which a transmitter antenna and a receiver antenna are oriented in non-parallel planes such that the vertical resistivity and the relative dip angle are decoupled. Preferably, either the transmitter or the receiver is mounted in a conventional orientation in a first plane that is normal to the tool axis, and the other antenna is mounted in a second plane that is not parallel to the first plane. Although this invention is primarily intended for MWD or LWD applications, this invention is also applicable to wireline and possibly other applications.

BRIEF DESCRIPTION OF THE DRAWINGS

This invention may best be understood by reference to the following drawings.

DETAILED DESCRIPTION OF A PREFERRED EMBODIMENT

Figure 1:
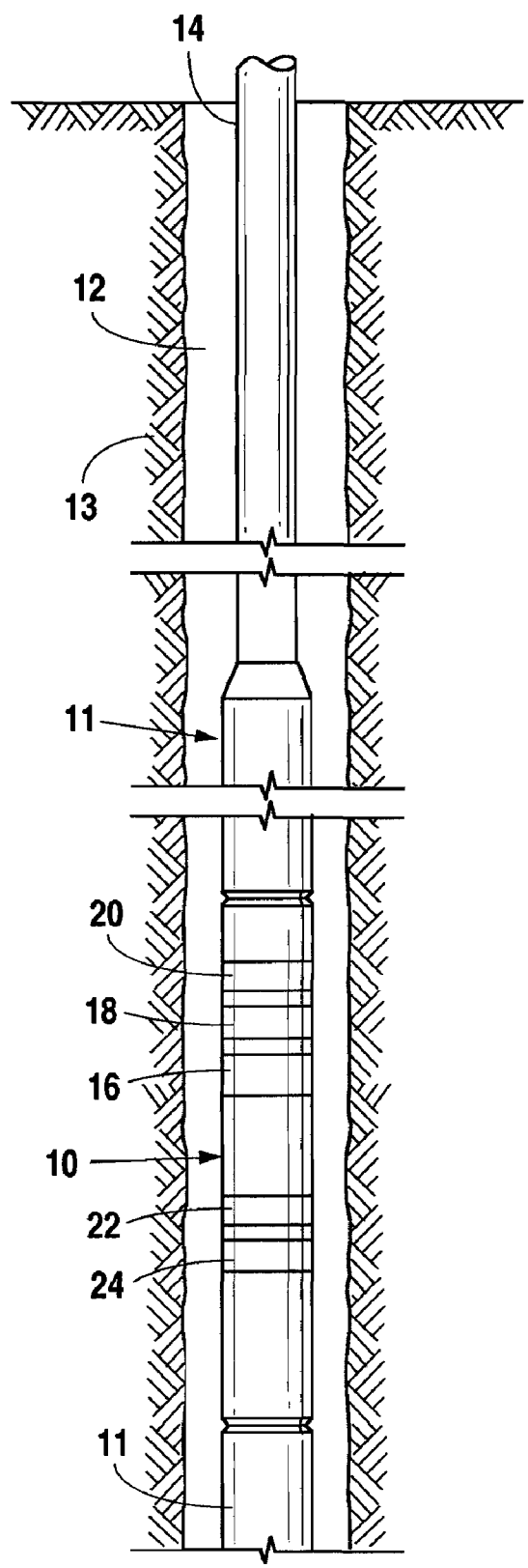
FIG. 1 is a schematic elevational view of an electromagnetic wave resistivity tool in accordance with the present invention.
Figure 2:
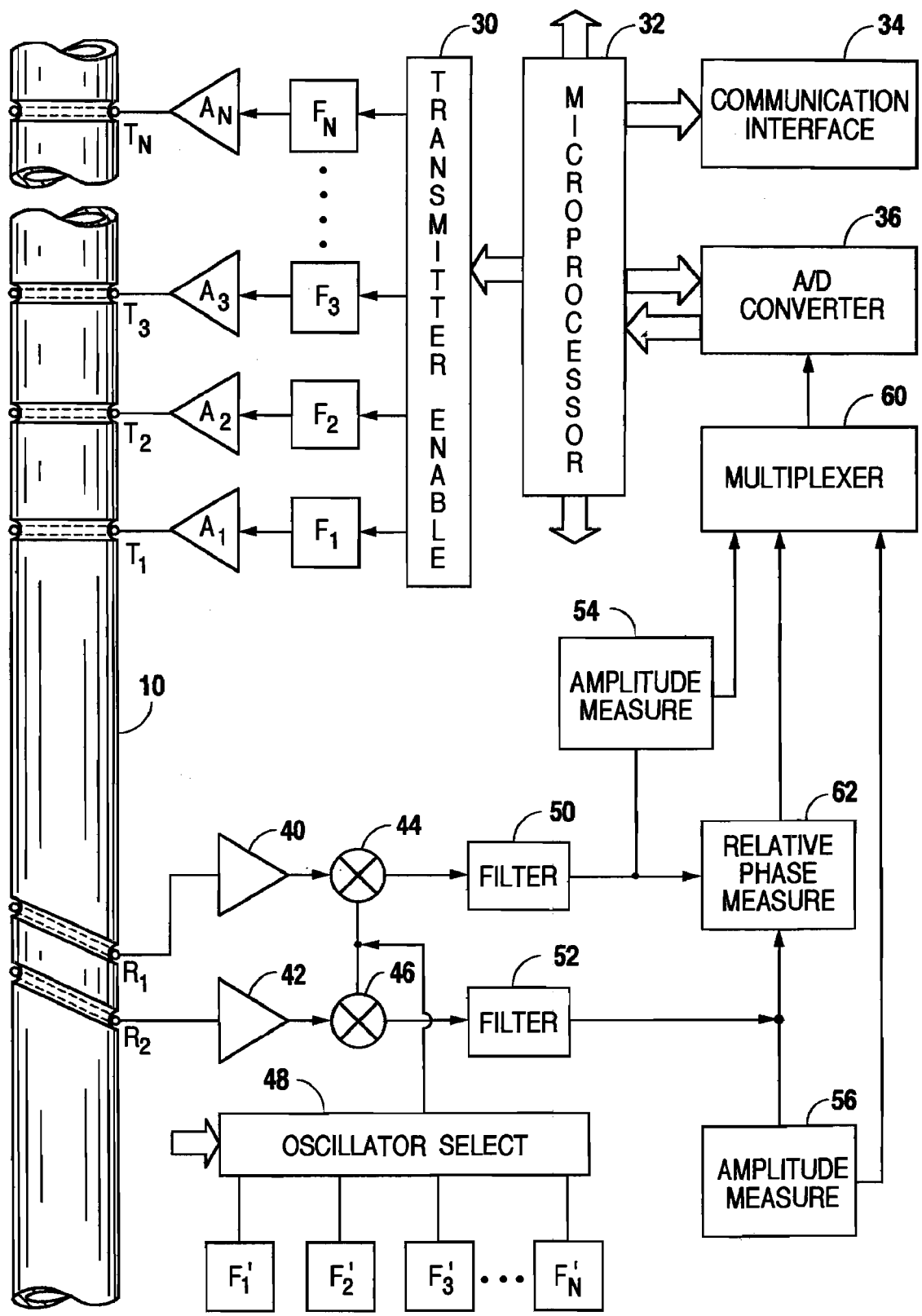
FIG. 2 is a schematic elevational view of a portion of the tool of FIG. 1 showing a block diagram of the circuitry used in accordance with the present invention.

FIG. 1 illustrates a logging tool 10 in accordance with the present invention suspended in a borehole 12 within an earth formation 13 on a string of drill pipe 14. Drill string 14 includes one or more drill collars 11. Electromagnetic transmitters (antennas) 16, 18, and 20 (sometimes referred to herein as transmitters $T_1$, $T_2$, and $T_3$, respectively) are spaced along the length of logging tool 10 from electromagnetic receivers (antennas) 22 and 24 (sometimes referred to herein as $R_1$ and $R_2$, respectively). Preferably, transmitters 16, 18, 20 and receivers 22, 24 are mounted in recesses in tool 10 (as indicated in FIG. 2) and are covered with a non-conductive material (not shown), as is well known in the art. If a transmitter is designed to operate at more than one frequency, for example, $f_1=2$ MHz and $f_2=1$ MHz, each receiver may comprise a pair of coils, with one coil tuned to $f_1$ and one coil tuned to $f_2$. Additionally, if desired, each pair of such receiver coils may be located side by side around the periphery of tool 10 or may be concentrically stacked. Transmitters 16, 18, 20 and receivers 22, 24 may be fabricated in accordance with the teachings of U.S. Pat. No. 4,940,943, which is assigned to the assignee of the present invention and is incorporated herein by reference. It should be appreciated that the body of tool 10 is preferably made of steel in order to prevent tool 10 from becoming a weak link in the drill string 14. Typically, and in a manner well known in the art, one or more drill collars 11 are threadably connected to the lower end of logging tool 10, and a drill bit (not illustrated) is threadably connected to the lowest drill collar 11.

It should be appreciated that logging tool 10 also has the requisite electronic circuitry (illustrated in FIG. 2) for processing the signals received by receivers 22, 24 in accordance with the present invention, thereby converting the received signals into a log or another indication of formation resistivity. It should also be appreciated that the processed signals can be recorded within the electronics section of tool 10 or may be fed by a conventional telemetry system (not illustrated) to the surface for concurrent processing and readout at the surface. A typical telemetry system generates mud pulses that can be detected at the earth's surface and are indicative of the processed signals.

Referring to FIG. 2, well logging tool 10 is illustrated as having a plurality of transmitters $T_1, T_2, T_3 \ldots T_n$. Although a preferred embodiment comprises only three such transmitters ($T_1, T_2$ and $T_3$), $T_n$ is illustrated for purposes of showing that additional transmitters may be used, if desired. It should be appreciated that $T_1, T_2, T_3 \ldots T_n$ are successively further spaced from the receiver pair $R_1$ and $R_2$. The distance between the coils used for $R_1$ and $R_2$ is preferably six inches along the longitudinal axis of tool 10, but other receiver spacings may also be used. The distance between the receiver pair and the successively spaced transmitters will vary in some applications, as discussed hereinafter in greater detail. A preferred configuration contains a distance between $T_1$ and $R_1/R_2$ of 12 inches/18 inches; a distance between $T_2$ and $R_1/R_2$ of 24 inches/30 inches; and a distance between $T_3$ and $R_1/R_2$ of 36 inches/42 inches. In the foregoing sentence, it should be understood that the term "12 inches/18 inches," for example, indicates that the distance between $T_1$ and $R_1$ is 12 inches and that the distance between $T_1$ and $R_2$ is 18 inches, based upon $R_1$ and $R_2$ being six inches apart. Such spacing configurations are sometimes referred to herein using an abbreviated expression of, for example, "12/18."

Still referring to FIG. 2, a plurality of amplifiers $A_1, A_2, A_3 \ldots A_n$ are coupled to the transmitter coils $T_1, T_2, T_3 \ldots T_n$, respectively. The plurality of amplifiers, in turn, are driven, respectively, by oscillators $F_1, F_2, F_3 \ldots F_n$. The operating frequencies of the oscillators are preferably between about 0.5 MHz up to about 4 MHz. Because of power attenuation at greater depths of investigation, such as is the case with the longer spaced transmitters, the frequencies preferably conform to the relationship $F_1 \geq F_2 \geq F_3 \geq \ldots F_n$. The oscillators $F_1, F_2, F_3 \ldots F_n$ are controlled by a transmitter enable circuitry 30, which interfaces with a microprocessor 32, which in turn interfaces with a communication interface circuit 34 and an analog-to-digital (A/D) converter 36. Communication interface circuit 34 is conventional and provides an interface between computers (not shown), an internal memory (not shown), a mud pulser (not shown), microprocessor 32, and operators or computers at the earth's surface (not shown) after the tool 10 is removed to the earth's surface.

The differential receivers $R_1$ and $R_2$ are respectively connected to amplifiers 40 and 42, which are connected, respectively, to mixer circuits 44 and 46. Oscillators $F_1', F_2', F_3' \ldots F_n'$ are coupled to an oscillator select circuit 48, the output of which is connected to the respective inputs of mixer circuits 44 and 46. Oscillator select circuit 48 receives its inputs from microprocessor 32.

The respective outputs of mixer circuits 44 and 46 drive low pass filters 50 and 52, respectively, the outputs of which drive amplitude measurement circuits 54 and 56, respectively. The outputs of amplitude measurement circuits 54 and 56 are connected to a multiplexer circuit 60. The outputs of low pass filter circuits 50 and 52 are also connected to the inputs of a relative phase measurement circuit 62, the output of which is fed into multiplexer 60.

Figure 12:
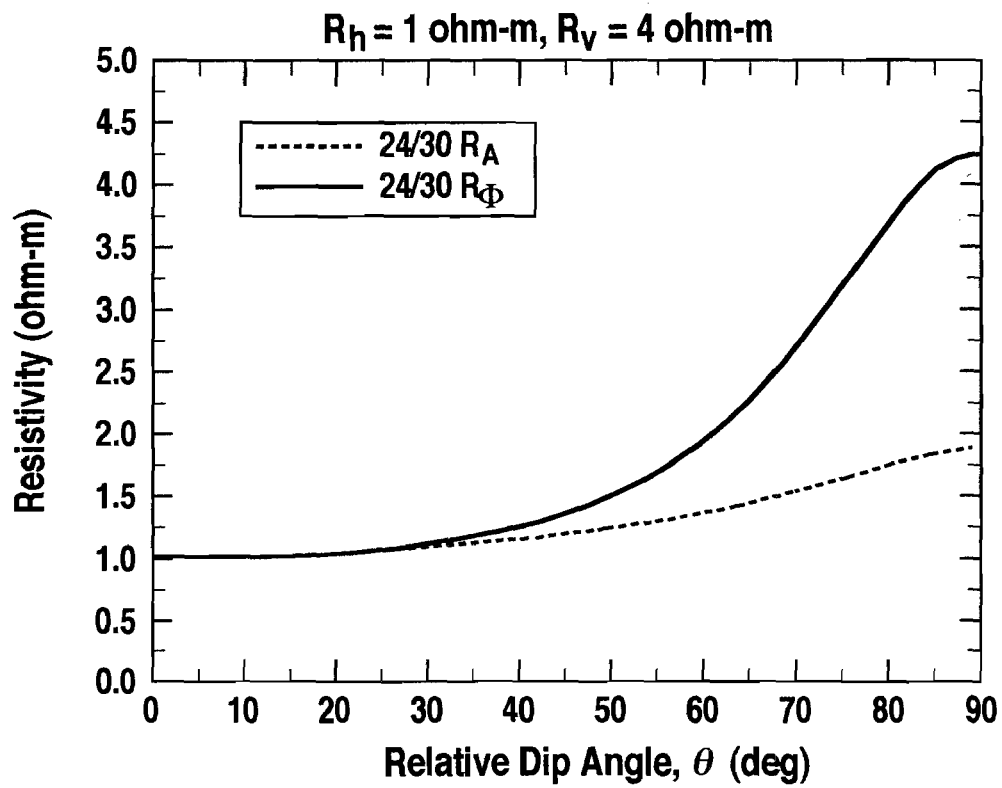
FIG. 12 is a graph of apparent resistivity versus relative dip angle for a typical earth formation using a single transmitter-receiver pair.
Figure 13:
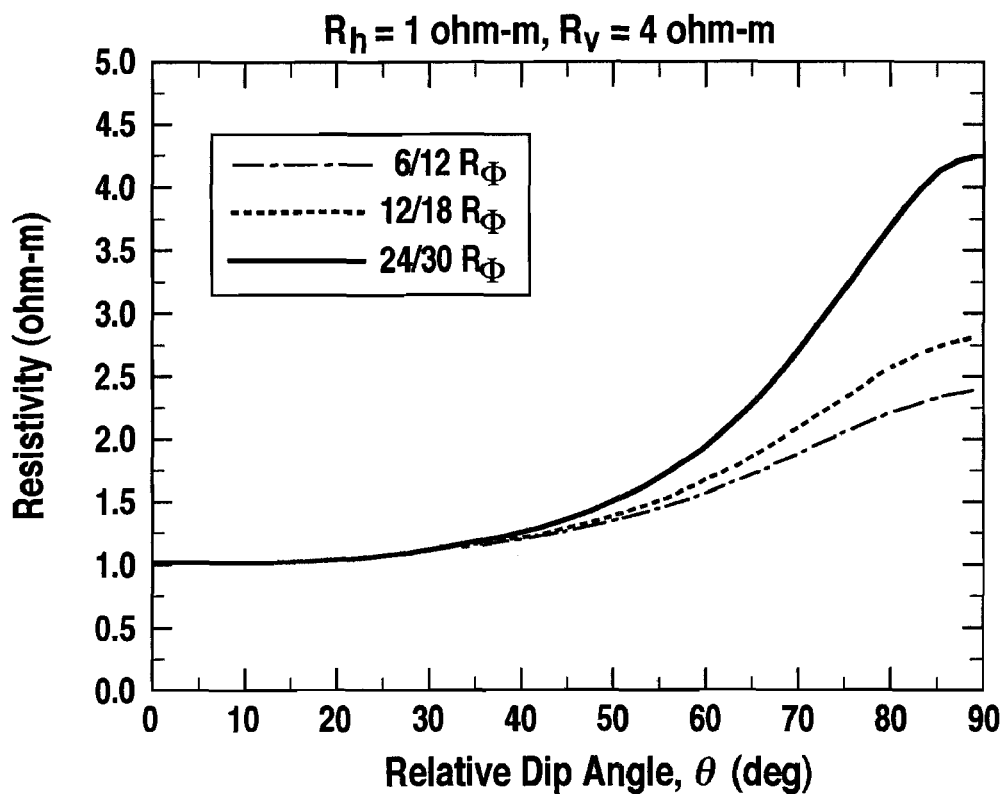
FIG. 13 is a graph of apparent resistivity versus relative dip angle for a typical earth formation using three transmitter-receiver pairs at a single frequency.
Figure 14:
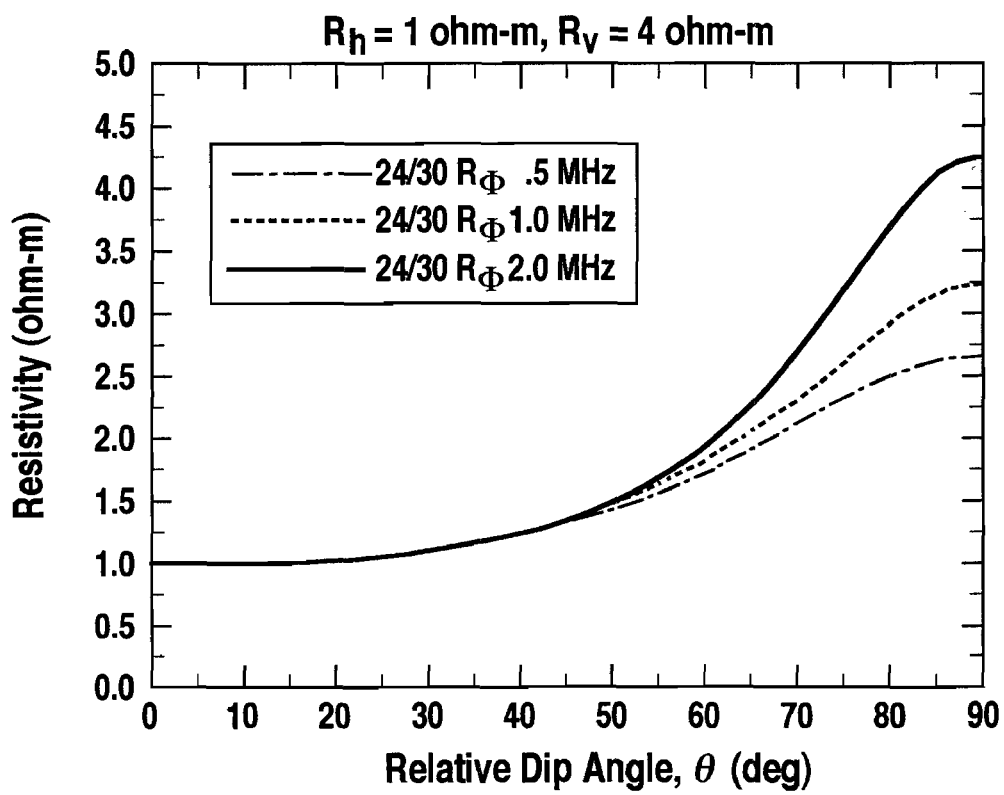
FIG. 14 is a graph of apparent resistivity versus relative dip angle for a typical earth formation using a single transmitter-receiver pair at three different frequencies.

In the operation of the device and circuitry illustrated in FIG. 2, it should be appreciated that it is desirable to process intermediate frequency signals rather than the nominal signals received by receiver pair $R_1$ and $R_2$. Accordingly, the oscillators $F_1', F_2', F_3' \ldots F_n'$ are selected to be very near the corresponding frequencies $F_1, F_2, F_3 \ldots F_n$. For example, $F_n$ can be set at a frequency of 1.998 MHz and thus provide an intermediate frequency coming out of mixer circuit 44 or 46 of 0.002 MHz (2 KHz). In a similar fashion, $F_2'$ and $F_3'$ can be set at 1.998 MHz and 0.998 MHz, respectively. Thus, the only signals that pass to low pass filters 50 and 52 will be the intermediate frequencies which are obtained by mixing the frequencies of $F_1, F_2, F_3 \ldots F_n$ with the frequencies $F_1', F_2', F_3' \ldots F_n'$, respectively. It should be appreciated that amplitude measurement circuit 54 provides a measure of the amplitude of the signal received by receiver $R_1$, whereas amplitude measurement circuit 56 measures the amplitude of the incoming signals received by receiver $R_2$. Similarly, relative phase measurement circuit 62 provides an indication of the phase difference between the signals received at receiver $R_1$ and the signals received at receiver $R_2$. As is well known in the art, the amplitude measurements (ratios, A) and the relative phase measurements ($\Phi$) are both indicative of formation resistivity. Such measurements may be used to generate plots such as those shown in FIGS. 12-14 for a typical earth formation having a horizontal resistivity of 1 ohm-m and a vertical resistivity of 4 ohm-m. FIG. 12 depicts amplitude attenuation resistivity and phase shift resistivity as a function of relative dip angle using a single transmitter-receiver pair at a single frequency. FIG. 13 depicts phase shift resistivity as a function of relative dip angle using three transmitter-receiver pairs at a single frequency. FIG. 14 depicts phase shift resistivity as a function of relative dip angle using a single transmitter-receiver pair at three different frequencies.

Figure 3:
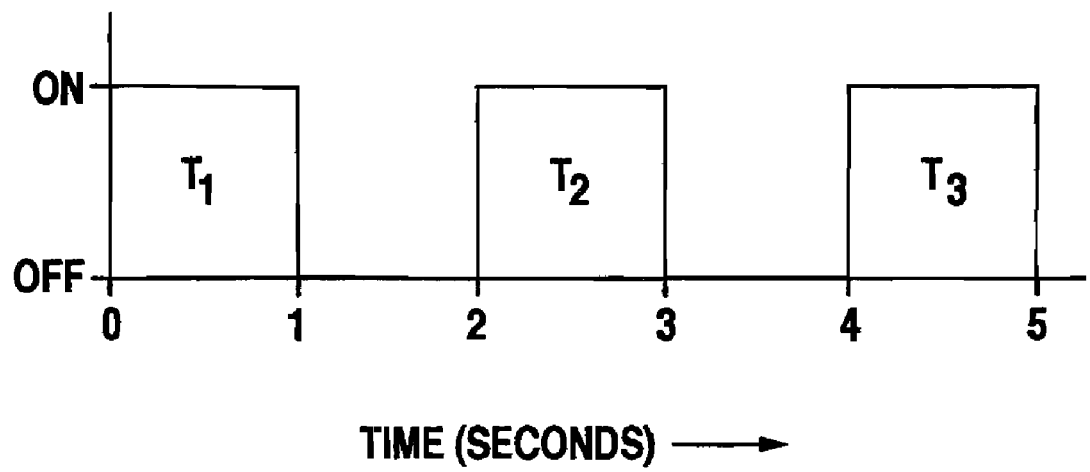
FIG. 3 is a schematic pulse diagram illustrating a time sequence of transmitter pulses of the tool of FIG. 1.
Figure 4:
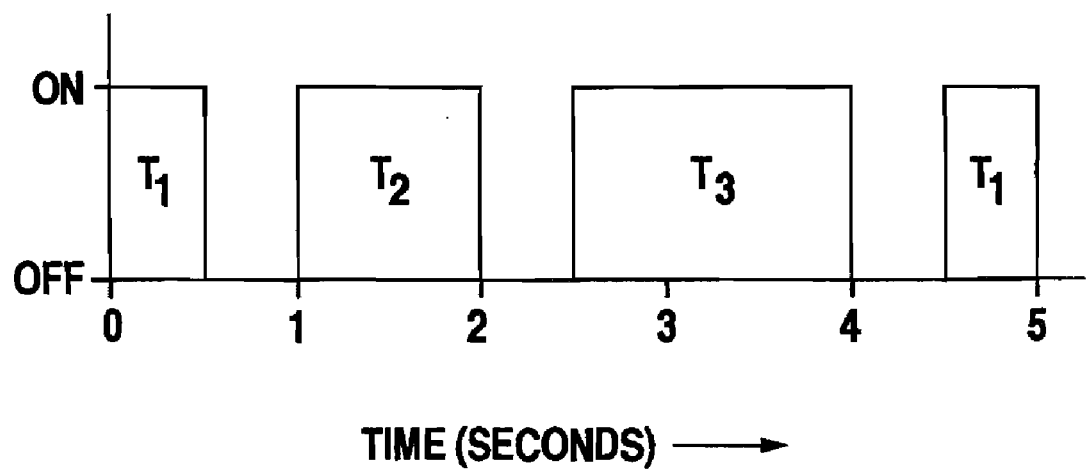
FIG. 4 is a schematic pulse diagram illustrating an alternative time sequence of transmitter pulses of the tool of FIG. 1.

It should also be appreciated that the frequencies $F_1, F_2, F_3 \ldots F_n$ could all be the same frequency except for the practical considerations of power loss in the formation due to the increased distance the signals have to travel through the formation. However, the conventional multiplexer circuitry 60 used with this system enables time separation between the sequential pulsing of the transmitters $T_1, T_2, T_3 \ldots T_n$. For example, as illustrated in FIG. 3, transmitter $T_1$ can be pulsed for one second, followed by no pulse for one second, followed by the pulsation of transmitter $T_2$ for one second, followed by no pulse for one second, followed by a pulsing of transmitter $T_3$ for one second, and so on. Quite obviously, the duration of the pulsing for each transmitter can be varied, as well as the duration of no pulsing in between, for example, as illustrated in FIG. 4. It should be appreciated that the expression "time separation" between pulses includes the preferred embodiment of having one pulse commence immediately with the termination of the immediately preceding pulse. As desired, the duration of the pulses controlling $T_1$ may vary from the duration of the pulses for $T_2$, which may vary from the duration of the pulses for transmitter $T_3$, and so on, in order to provide a signature of the received pulses at receivers $R_1$ and $R_2$ to better identify the transmitters and thus the depth of investigation for the particular pulses being received. Thus, measurements are made to different depths into the formation by activating each transmitter at a different time such that only one transmitter is active at any one time and by recording or telemetering the received phase difference and/or amplitudes (amplitude ratio) corresponding to each transmitted signal. Alternatively, the transmitters $T_1, T_2, T_3 \ldots T_n$ could all be operated at different frequencies and could be pulsed simultaneously, with the separation of signals being a function of frequency difference rather than time separation in accordance with a preferred embodiment of this invention. However, those skilled in the art will recognize that simultaneous transmission of all of the transmitter signals will usually require additional filters and processing circuitry to enable the instrument to properly discriminate between the different frequencies.

Figure 5:
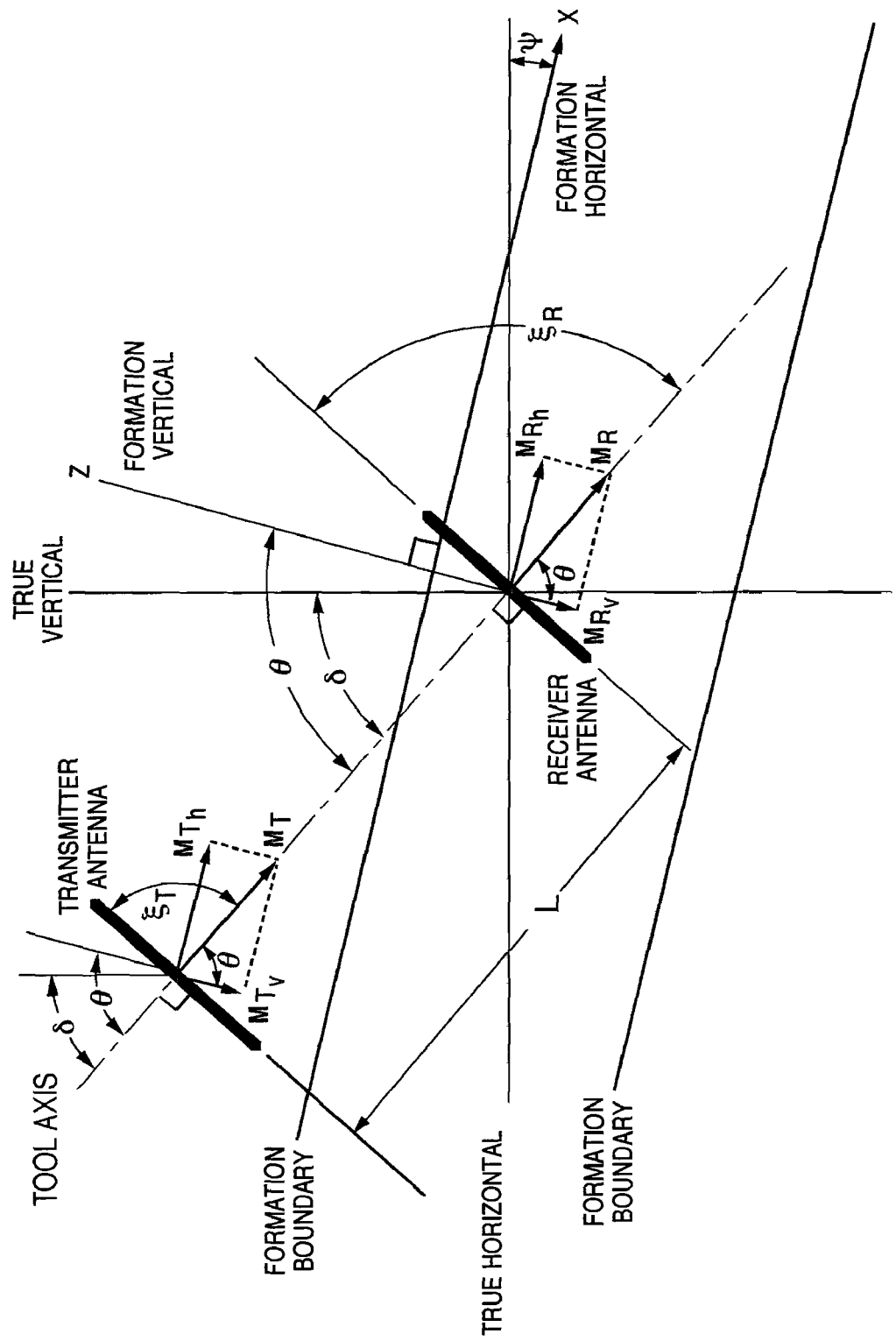
FIG. 5 is a schematic diagram illustrating the antenna geometry of a conventional electromagnetic wave resistivity tool having a transmitter antenna and a receiver antenna, both of which are mounted to the tool in a plane that is orthogonal to the axis of the tool.
Figure 6:
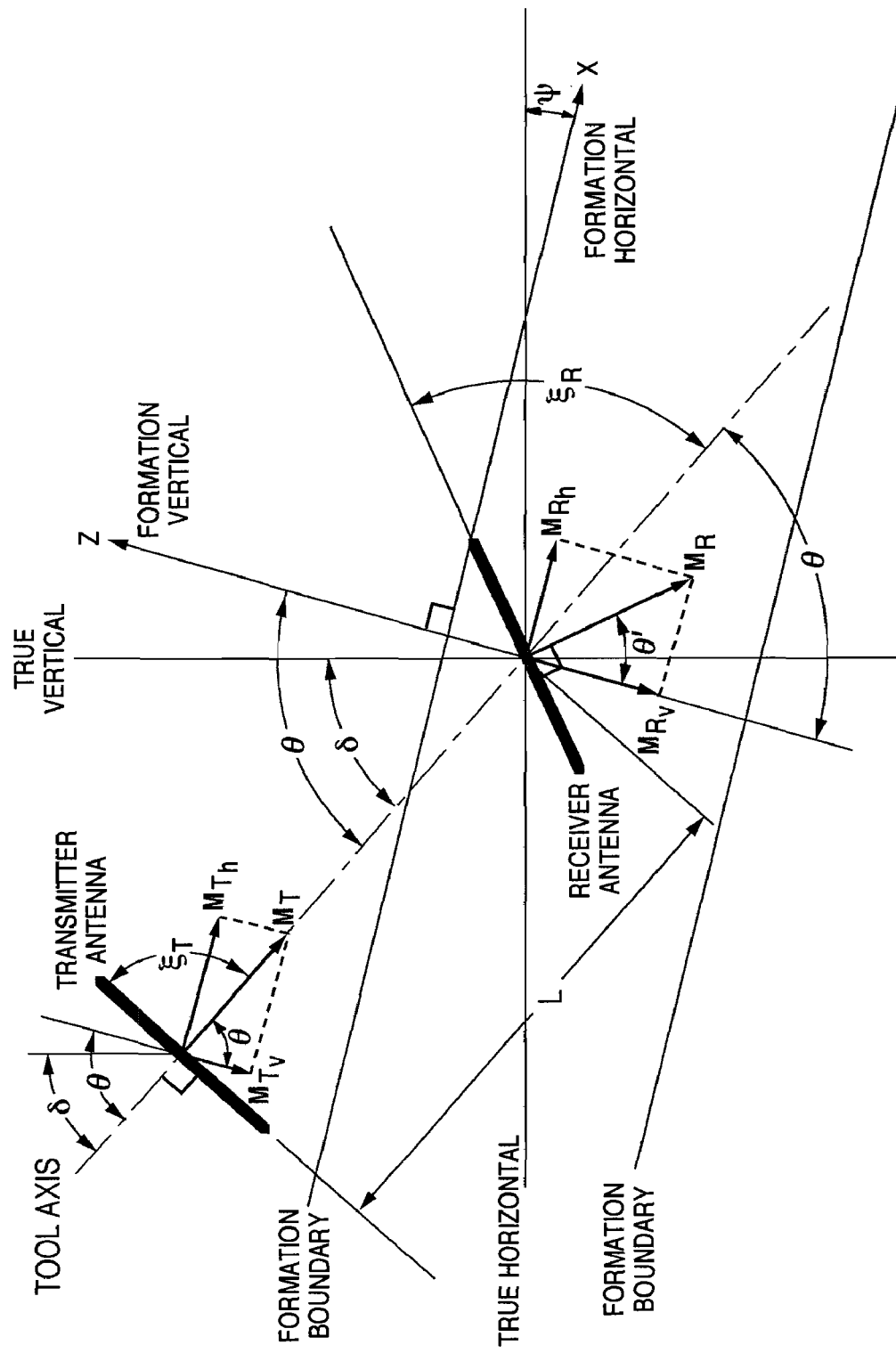
FIG. 6 is a schematic diagram illustrating the antenna geometry of an electromagnetic wave resistivity tool in accordance with the present invention having a transmitter antenna mounted to the tool in a plane that is orthogonal to the axis of the tool and a receiver antenna mounted to the tool in a plane that is not orthogonal to the axis of the tool.
Figure 9:
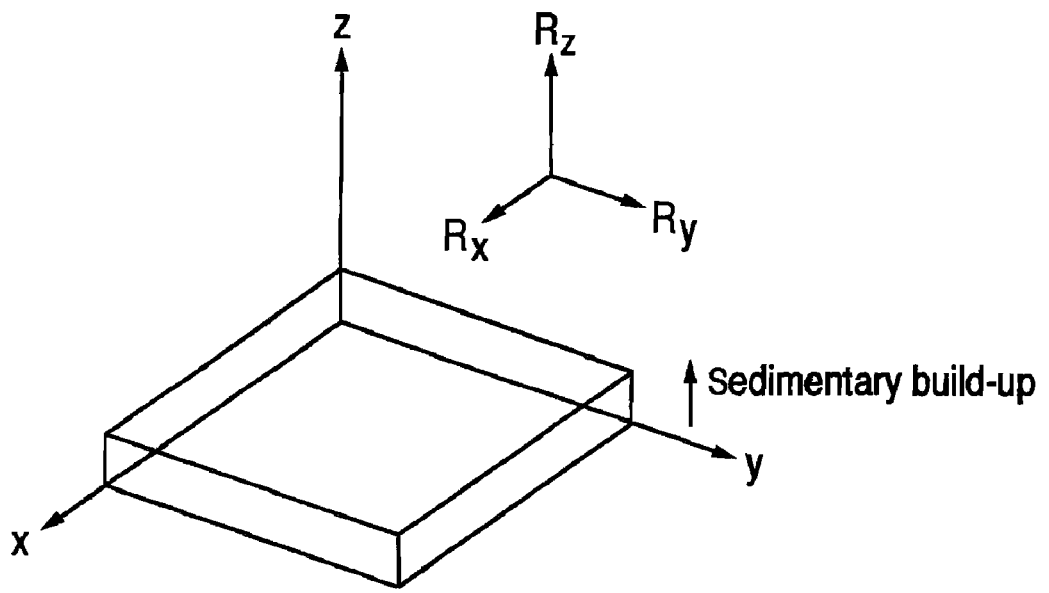
FIG. 9 is a schematic perspective view of a Cartesian coordinate system in a sedimentary earth formation.

As discussed above, due to the nature of sedimentary formations, practitioners in the art use the term "horizontal" to denote the plane of the formation (i.e., the x-y plane of FIG. 9), and practitioners use the term "vertical" to denote the direction perpendicular to the plane of the formation (i.e., the z direction of FIG. 9, which is the direction of sedimentary build-up). For convenience in distinguishing between these terms of art and the ordinary directions associated with the earth's gravity, FIGS. 5 and 6 utilize the following terms: "true vertical" indicates the direction of the earth's gravity; "true horizontal" indicates the direction perpendicular to the earth's gravity; "formation vertical" indicates the direction perpendicular to the plane of the formation; and "formation horizontal" indicates the plane of the formation. In this description, the terms "horizontal" and "vertical" are intended to have the meanings associated with "formation horizontal" and "formation vertical," respectively. In FIGS. 5 and 6, $\delta$ is the hole deviation angle (the angle between the borehole/tool axis and the true vertical), and $\psi$ is the bed dip angle (the angle between the formation bed plane and the true horizontal).

Referring to FIG. 5, a transmitter coil (antenna) with a magnetic moment $M_T$ can be considered as the superposition of a horizontal magnetic dipole (HMD) and a vertical magnetic dipole (VMD), with corresponding horizontal and vertical component magnetic moments $M_{T_h}$ and $M_{T_v}$, respectively, which are given by the equations $$M_{T_h} = M_T \sin\theta = I_t A_t \sin\theta \quad [1]$$

$$M_{T_v} = M_T \cos\theta = I_t A_t \cos\theta \quad [2]$$

where
$I_t$=the current in the transmitter coil,
$A_t$=the cross-sectional area of the transmitter coil, and
$\theta$=the relative dip angle (the angle between the tool axis and the normal to the formation).

As shown by Luling, M. G., "Processing and Modeling 2-MHz Resistivity Tools in Dipping, Laminated, Anisotropic Formations," SPWLA 35th Annual Logging Symposium, Jun. 19-22, 1994, the HMD produces magnetic fields $H_{hx}$ and $H_{hz}$, and the VMD produces magnetic fields $H_{vx}$ and $H_{vz}$ as follows:

$$H_{hx} = \frac{M_T \sin\theta}{4\pi}\left(\frac{e^{-ik_hL}}{L^3}\begin{bmatrix} 3\sin^2\theta - 1 + \\ k_h^2 L^2 \cos^2\theta + \\ \frac{ik_h L}{\sin^2\theta} + ik_h L \\ -3ik_h L \sin^2\theta \end{bmatrix} - \frac{ik_h}{\sin^2\theta}e^{ik_h L\beta}\right)e^{ik_h L} \quad [3]$$

$$H_{hz} = \frac{M_T \cos\theta}{4\pi}\left(\frac{e^{ik_h L}}{L^3}\begin{bmatrix} 3\cos\theta\sin\theta - k_h^2 L^2 \cos\theta\sin\theta - \\ 3ik_h L\cos\theta\sin\theta \end{bmatrix}\right) \quad [4]$$

$$H_{vx} = \frac{M_T \sin\theta}{4\pi}\left(\frac{e^{ik_h L}}{L^3}\begin{bmatrix} 3\cos\theta\sin\theta - k_h^2 L^2 \cos\theta\sin\theta - \\ 3ik_h L\cos\theta\sin\theta \end{bmatrix}\right) \quad [5]$$

$$H_{vz} = \frac{M_T \cos\theta}{4\pi}\left(\frac{e^{ik_h L}}{L^3}\begin{bmatrix} 3\cos^2\theta - 1 + k_h^2 L^2 \sin^2\theta - \\ 3ik_h \cos^2\theta + ik_h L \end{bmatrix}\right) \quad [6]$$

where $$k_h = \sqrt{\omega^2 \mu\left(\varepsilon_h - \frac{i\sigma_h}{\omega}\right)}$$

$$k_v = \sqrt{\omega^2 \mu\left(\varepsilon_v - \frac{i\sigma_v}{\omega}\right)}$$

$$\beta = \sqrt{\cos^2\theta + \left(\frac{k_v}{k_h}\right)^2 \sin^2\theta}$$

$k_h$=the complex wave number in the horizontal direction
$k_v$=the complex wave number in the vertical direction
$\omega$=the angular frequency (in radians/second) of the transmitter coil=$2\pi f$
f=the frequency of the transmitter coil (in Hertz)
$\mu$=the magnetic permeability of the formation (assume $\mu=\mu_{air}=1$)
$\sigma_h$=the horizontal conductivity of the formation
$\sigma_v$=the vertical conductivity of the formation
$\varepsilon_h$=the horizontal dielectric constant (assumed)
$\varepsilon_v$=the vertical dielectric constant (assumed)
L=the distance between the transmitter coil and the receiver coil
i=$\sqrt{-1}$ If a receiver is parallel to the transmitter, for a conventional configuration as shown in FIG. 5 in which $\xi_T = \xi_R = 90°$, the $H_z$ field in the receiver loop is given by the equation $$H_z = (H_{hx} + H_{vx})\sin\theta + (H_{vz} + H_{hz})\cos\theta \quad [7]$$

and the induced voltage in the receiver loop is $$V = i\omega A_r \mu H_z \quad [8]$$

where $A_r$ is the cross-sectional area of the receiver coil. Substituting Eqs. [3], [4], [5], [6], and [7] into Eq. [8] yields $$V = \frac{i\omega A_r \mu I_t A_t}{4\pi L^3}([2 - ik_h L]e^{ik_h L} - ik_h L e^{ik_h L\beta}) \quad [9]$$

Equation [9] shows that the induced voltage, V, depends on $k_h$ and $\beta$. In turn, $k_h$ depends on $\sigma_h$; and $\beta$ depends on $\sigma_h$, $\sigma_v$, and $\theta$. These relationships indicate that $\sigma_v$ and $\theta$ are dependent, and this dependency prevents convergence of a simultaneous solution for $\sigma_h$, $\sigma_v$, and $\theta$, as discussed above.

To break this dependency and enable a solution for $\sigma_h$, $\sigma_v$, and $\theta$, the present inventor discovered that one may tilt either the transmitter or the receiver with respect to the tool axis, as shown in FIG. 6 (transmitter not tilted, receiver tilted). For a transmitter/receiver configuration as shown in FIG. 6 in which $\xi_T=90°$ and $\xi_R<90°$, the $H_z$ field in the receiver loop is given by the equation $$H_z = (H_{hx}+H_{vx})\sin\theta' + (H_{vz}+H_{hz})\cos\theta' \quad [10]$$

Substitution of Eqs. [3], [4], [5], [6], and [10] into Eq. [8] yields $$V = \frac{i\omega A_r \mu I_t A_t}{4\pi L^3} \begin{pmatrix} +[2\sin\theta\sin\theta' + 2\cos\theta\cos\theta']e^{ik_hL} - \\ [2ik_hL\sin\theta\sin\theta' - 2ik_hL\cos\theta\cos\theta']e^{ik_hL} + \\ ik_hL\frac{\sin\theta'}{\sin\theta}e^{ik_hL} - ik_hL\frac{\sin\theta'}{\sin\theta}e^{ik_hL\beta} \end{pmatrix} \quad [11]$$

where $$\theta' = \theta + \xi_R - 90°$$

$\xi_R$ = the angle of tilt of the receiver antenna (i.e., the angle between the plane of the receiver antenna and the tool axis)

$\xi_T$ = the angle of tilt of the transmitter antenna (i.e., the angle between the plane of the transmitter antenna and the tool axis).

Figure 7:
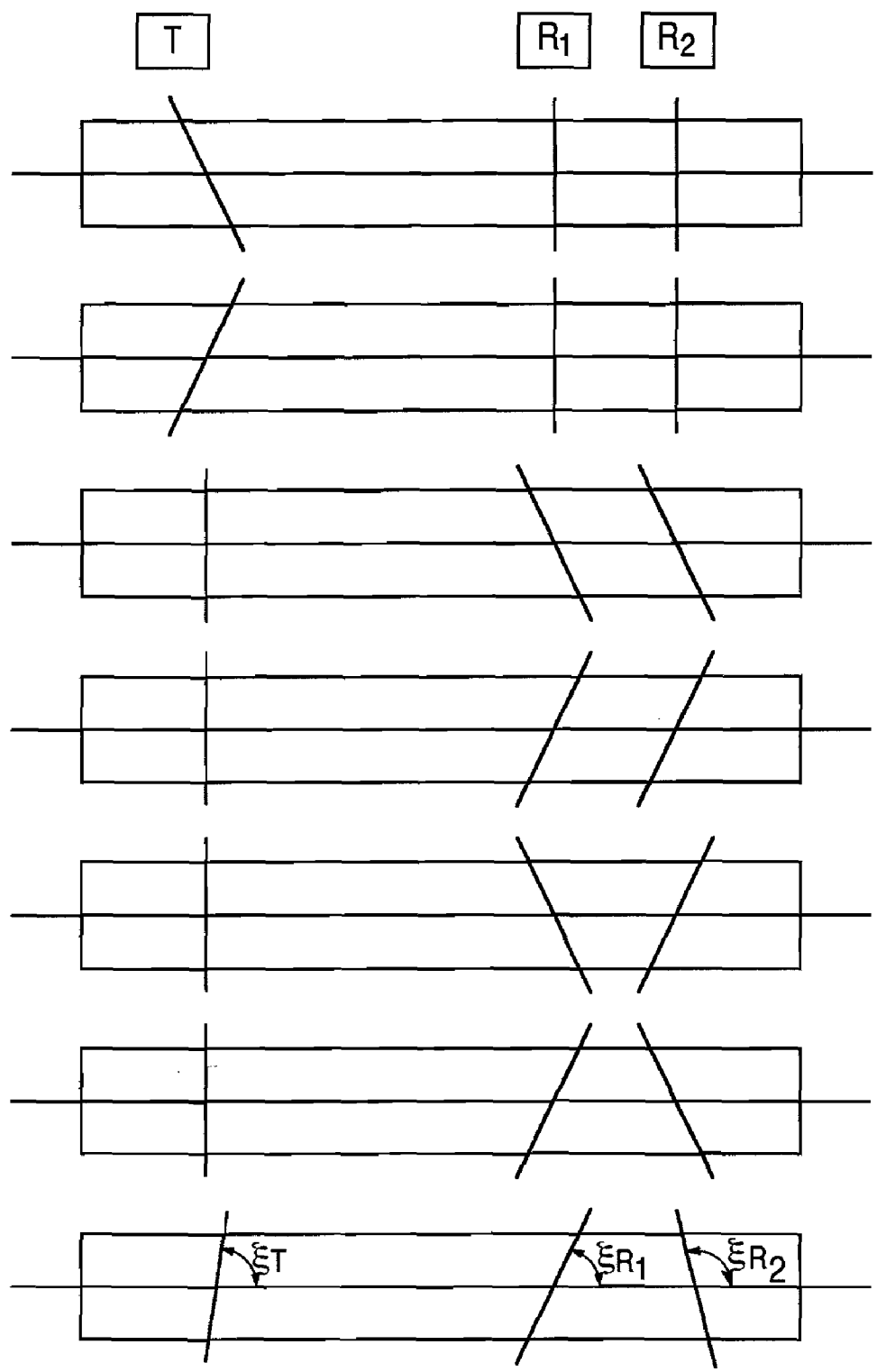
FIG. 7 is a schematic diagram illustrating several possible transmitter/receiver antenna configurations in accordance with the present invention.

Equation [11] shows that the induced voltage, V, depends on $k_h$, $\beta$, $\theta$, and $\theta'$. As long as $\theta$ is different from $\theta'$, then $\theta$ can be calculated from three measurements using a multiple spacing or multiple frequency electromagnetic wave resistivity tool. By tilting either the receiver or the transmitter of an electromagnetic wave resistivity sensor (i.e., by making $\theta$ different from $\theta'$), $\sigma_v$ and $\theta$ are decoupled, which enables a solution for $\sigma_h$, $\sigma_v$, and $\theta$ as described below. Although the above formulation is for an untilted transmitter with a tilted receiver, the theory of reciprocity provides that the same result also applies to a tilted transmitter with an untilted receiver. Indeed, both the transmitter and the receiver may be tilted, provided that the respective angles of tilt are not the same, i.e., $\xi_T \neq \xi_R$. For the general case in which both the transmitter and the receiver are tilted at arbitrary angles $\xi_T$ and $\xi_R$, respectively, Eqs. [1] through [11] apply with the substitution of $\theta''$ for $\theta$, where $\theta'' = \theta + \xi_T - 90°$. FIG. 7 illustrates several possible transmitter/receiver pair combinations in accordance with the present invention.

Figure 8:
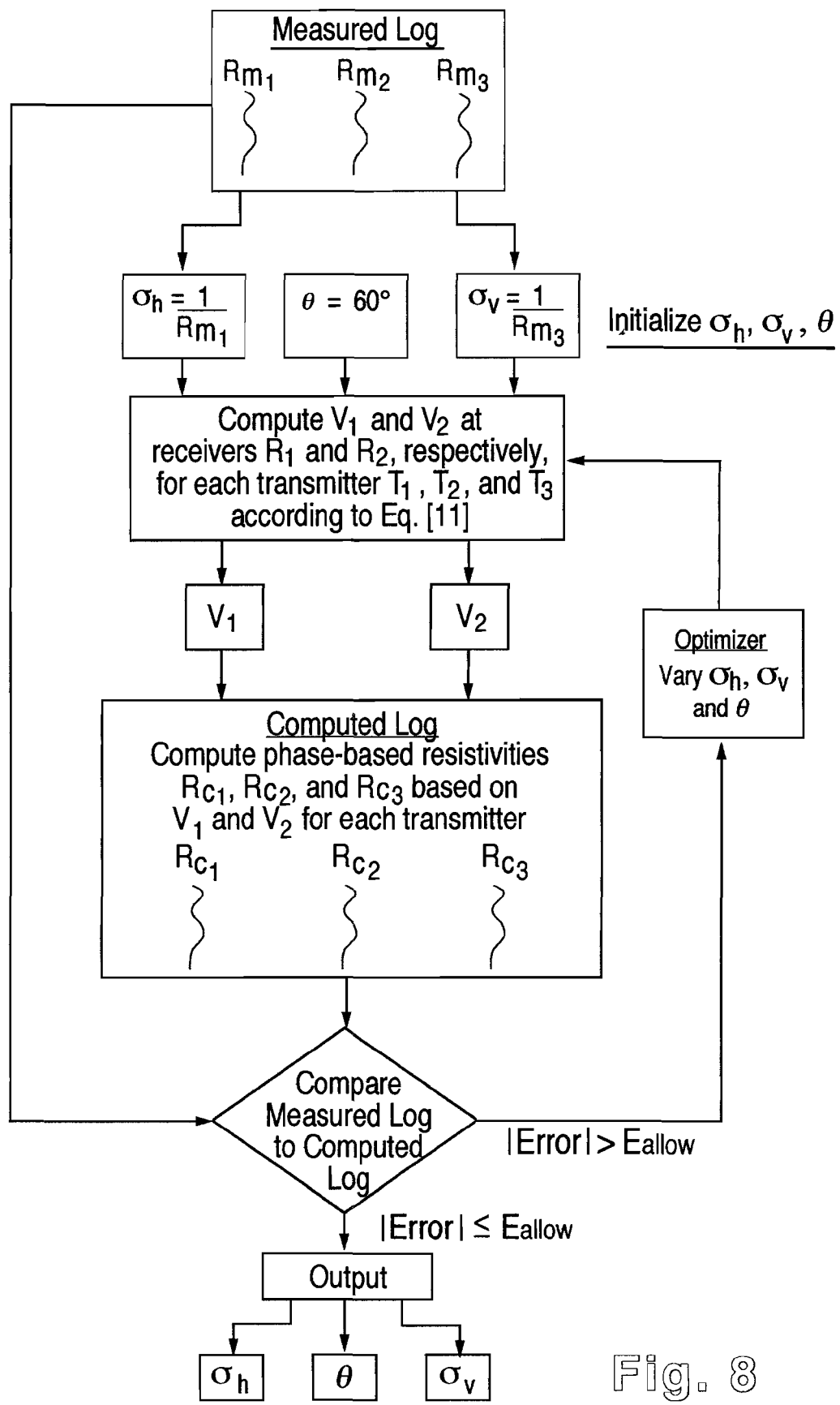
FIG. 8 is a schematic block diagram illustrating the process of solving for horizontal conductivity, vertical conductivity, and relative dip angle in accordance with the present invention.
Figure 10:
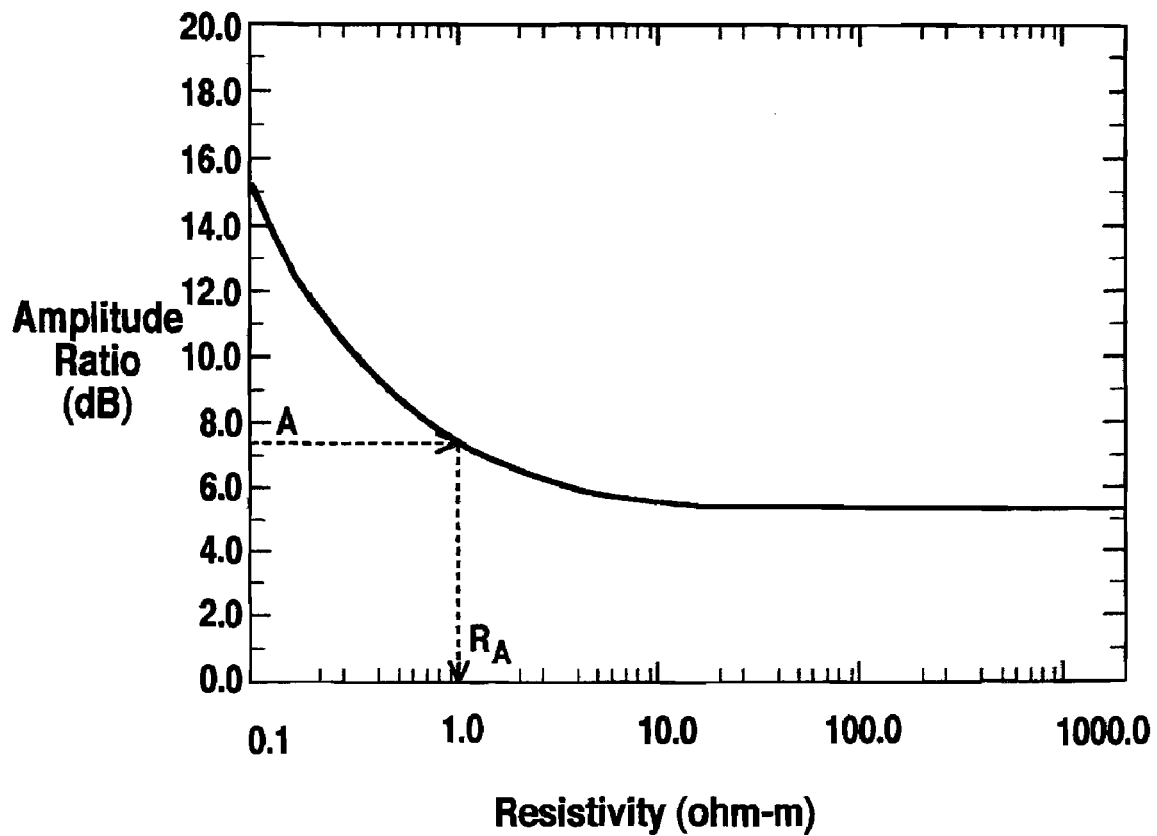
FIG. 10 is a graph of amplitude attenuation versus resistivity for a typical earth formation.
Figure 11:
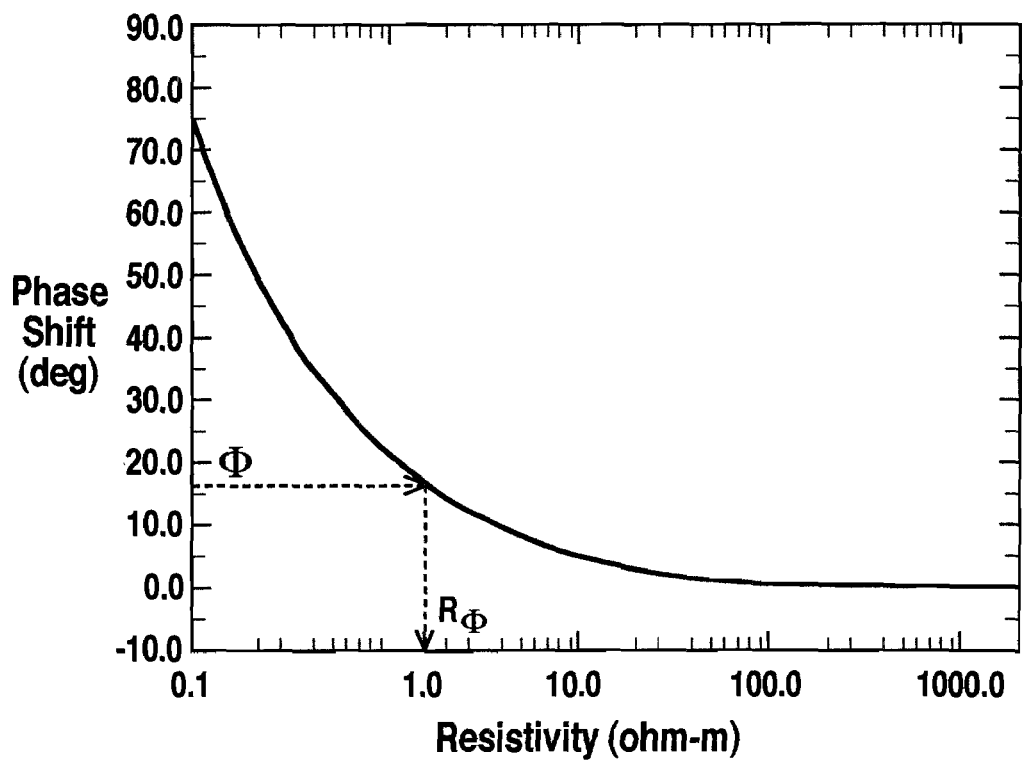
FIG. 11 is a graph of phase shift versus resistivity for a typical earth formation.

FIG. 8 illustrates the process of obtaining the horizontal resistivity, vertical resistivity, and relative dip angle of an earth formation in accordance with the present invention. Although the diagram of FIG. 8 shows horizontal and vertical conductivity rather than horizontal and vertical resistivity, persons reasonably skilled in the art understand that conductivity is the reciprocal of resistivity, and either conductivity or resistivity may be used to refer to the essential electrical property of an earth formation. The solution process begins with an initialization of the three parameters for which a solution is sought, namely, horizontal conductivity ($\sigma_h$), vertical conductivity ($\sigma_v$), and relative dip angle ($\theta$). As shown in FIG. 8, $\sigma_h$ and $\sigma_v$ may conveniently be initialized to the reciprocals of the measured resistivity values (measured log) as obtained from two of the three transmitter/receiver combinations according to methods well known in the art. Specifically, for each transmitter/receiver combination, the transmitter is pulsed and the phase shift ($\Phi$) and amplitude attenuation (A) of the receiver pair are measured. Then, using data such as that represented in FIGS. 10 and 11, the amplitude attenuation resistivity and phase shift resistivity, respectively, are obtained. The phase shift resistivities provide preferred initial estimates for $\sigma_h$ and $\sigma_v$, but the amplitude attenuation resistivities could also be used. Similarly, a convenient initial estimate for $\theta$ is 60°, which is within the range in which anisotropy typically becomes evident. Persons skilled in the art will appreciate that these preferred values for the initial parameter estimates serve the purpose of convenience to enhance the convergence of a solution. However, these particular values are not essential to the success of this invention, and the initial parameter estimates may be arbitrary.

Still referring to FIG. 8, after the parameters are initialized, these parameters are used to calculate theoretical "induced" voltages, $V_1$ and $V_2$, in receivers $R_1$ and $R_2$, respectively, for each transmitter according to Eq. [11]. Next, the calculated voltages are used to obtain computed resistivities $R_{c_1}$, $R_{c_2}$, and $R_{c_3}$ (computed log) corresponding to each transmitter/receiver pair combination, respectively. Again, the computed resistivities are obtained according to methods well known in the art using data such as that shown in FIGS. 10 and 11, and the phase shift resistivities are preferred over the amplitude attenuation resistivities. The computed resistivities are then compared to the measured resistivities, and the difference between the computed resistivities and the measured resistivities is used to form a suitable error measurement. If the magnitude of the error is less than or equal to an allowable error value, $E_{allow}$, then the current values for $\sigma_h$, $\sigma_v$, and $\theta$ are taken to be the solution. Otherwise, the values for $\sigma_h$, $\sigma_v$, and $\theta$ are incremented in an iterative optimization routine until the error is within the allowable error value. Any suitable optimization routine may be used, such as a least squares method. A preferred optimization method is the Levenberg-Marquardt method discussed by Tianfei Zhu and Larry D. Brown, "Two-dimensional Velocity Inversion and Synthetic Seismogram Computation," Geophysics, vol. 52, no. 1, January 1987, p. 37-50, which is incorporated herein by reference.

Although the foregoing specific details describe a preferred embodiment of this invention, persons reasonably skilled in the art of petroleum well drilling and logging will recognize that various changes may be made in the details of the method and apparatus of this invention without departing from the spirit and scope of the invention as defined in the appended claims. Therefore, it should be understood that this invention is not to be limited to the specific details shown and described herein.

What is claimed is:

1. A formation resistivity logging tool configured to evaluate the resistivity of an earth formation during a drilling operation, comprising:
    a tool body having a longitudinal tool axis and an outer surface, the tool body configured for coupling in a drill string;
    transmitter circuitry supported by the tool body;
    a first transmitter antenna surrounding the tool body and oriented at a first angle relative to the tool axis, the first transmitter antenna operably coupled to the transmitter circuitry and configured to transmit an electromagnetic wave into an earth formation;
    a second transmitter antenna surrounding the tool body and oriented at the first angle relative to the tool axis, the first transmitter antenna operably coupled to the transmitter circuitry and configured to transmit an electromagnetic wave into an earth formation;
    a first receiver antenna surrounding the tool body and oriented at a second angle relative to the tool axis, the first receiver antenna configured to receive an electromagnetic wave from the earth formation that is a result of the electromagnetic wave from the first transmitter antenna and to provide a first antenna output signal in response thereto, and wherein said first angle is different from said second angle;

a second receiver antenna surrounding the tool body and oriented at a third angle relative to the tool axis, the second receiver antenna configured to receive an electromagnetic signal from the earth formation that is a result of the electromagnetic wave from the second transmitter antenna and to provide a second antenna output signal in response thereto, and wherein the second receiver antenna is in non-parallel relation to the first receiver antenna; and processing circuitry operably coupled to the first receiver antenna to receive the first antenna output signal, the processing circuitry configured to determine at least one formation property at least partially in reference to the first antenna output signal.

2. The formation resistivity logging tool of claim 1, wherein the processing circuitry is further operably coupled to the second receiver antenna to receive the second antenna output signal, and is further configured to determine said at least one formation property partially in reference to the second antenna output signal.

* * * * *